United States Patent [19]
Nguyen et al.

[11] Patent Number: 6,119,130
[45] Date of Patent: *Sep. 12, 2000

[54] METHOD AND APPARATUS FOR PROVIDING SCHEMA EVOLUTION WITHOUT RECOMPILATION

[75] Inventors: Tin Anh Nguyen, Danville; Susan Marie Kotsovolos, Belmont; Srinath Krishnaswamy, Redwood City, all of Calif.

[73] Assignee: Oracle Corporation, Redwood Shores, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/624,191

[22] Filed: Mar. 28, 1996

[51] Int. Cl.[7] .................................................. G06F 17/30
[52] U.S. Cl. ........................... 707/203; 707/200; 707/100
[58] Field of Search ..................... 395/619, 500; 364/300; 340/709; 707/203, 100, 200, 103, 101

[56] References Cited

U.S. PATENT DOCUMENTS

| | | | |
|---|---|---|---|
| 4,558,413 | 12/1985 | Schmidt et al. | 364/300 |
| 4,686,522 | 8/1987 | Hernandez et al. | 340/709 |
| 5,058,000 | 10/1991 | Cox et al. | 364/200 |
| 5,280,612 | 1/1994 | Lorie et al. | 395/619 |
| 5,347,653 | 9/1994 | Flynn et al. | 395/619 |
| 5,446,880 | 8/1995 | Balgeman et al. | 707/100 |
| 5,495,561 | 2/1996 | Holt | 395/114 |
| 5,504,879 | 4/1996 | Eisenberg et al. | 395/619 |
| 5,511,188 | 4/1996 | Pascucci et al. | 395/619 |
| 5,517,670 | 5/1996 | Allen et al. | 395/850 |
| 5,526,518 | 6/1996 | Kashio | 707/3 |
| 5,535,386 | 7/1996 | Wang | 395/619 |
| 5,539,918 | 7/1996 | Allen et al. | 395/853 |
| 5,548,753 | 8/1996 | Linstead et al. | 707/10 |
| 5,559,954 | 9/1996 | Sakoda et al. | 395/164 |

(List continued on next page.)

OTHER PUBLICATIONS

Elisa Bertino, Lorenzo Martino, *Object–Oriented Database Management Systems: Concepts and Issues,* Apr. 1991, pp. 33–47.

Charles W. Krueger, *Software Reuse,* ACM Computing Surveys, vol. 24, No. 2, Jun. 1992, pp. 132–183.

K. Narayanaswamy, K.V. Bapa Rao, *An Incremental Mechanism for Schema Evolution in Engineering Domains,* 1988, pp. 294–301.

Simon Monk, Ian Sommerville, *Schema Evolution in OODBs Using Class Versioning,* Sigmod Record, vol. 22, No. 3, Sep. 1993, pp. 16–22.

J.F. Roddick, *Dynamically Chaning Schemas Within Database Models,* The Austrailian Computer Journal, vol. 23, No. 3, Aug. 1991, pp. 105–109.

Jay Banerjee, Won Kim, Hyoung–Joo Kim, Henry F. Korth, *Semantics and Implementation of Schema Evolution in Object–Oriented Databases,* 1987, pp. 311–322.

(List continued on next page.)

*Primary Examiner*—Thomas G. Black
*Assistant Examiner*—Frantz Coby
*Attorney, Agent, or Firm*—McDermott, Will & Emery

[57] ABSTRACT

A method and apparatus that allow schema version evolution to occur without requiring applications that expect older schema versions to be recompiled is provided. According to one aspect of the invention, each application that requests data is supplied the data in the format that the application expects. To supply the data in the expected format, a mechanism is provided for tracking the evolution of data types without losing information. In addition, mechanisms are provided for determining the format expected by the application and the format in which the data is currently stored. A mechanism is also provided for converting the data from the stored format to the expected format when the two formats do not match. A data migration strategy is described in which data is gradually migrated to newer formats when the data is updated by applications that expect a more recent format than the format in which the data is currently stored.

48 Claims, 8 Drawing Sheets

U.S. PATENT DOCUMENTS

| | | | |
|---|---|---|---|
| 5,600,833 | 2/1997 | Seen et al. | 707/1 |
| 5,600,836 | 2/1997 | Alter | 707/101 |
| 5,603,027 | 2/1997 | Ohkami | 707/203 |
| 5,625,465 | 4/1997 | Lech et al. | 358/448 |
| 5,625,816 | 4/1997 | Burdick et al. | 707/103 |
| 5,627,996 | 5/1997 | Bauer | 395/500 |
| 5,649,101 | 7/1997 | Mathewson, II | 395/200.02 |
| 5,652,876 | 7/1997 | Ashe et al. | 395/500 |
| 5,657,259 | 8/1997 | Davis et al. | 364/715.03 |
| 5,680,618 | 10/1997 | Freund | 707/200 |
| 5,706,504 | 1/1998 | Atkinson et al. | 707/100 |
| 5,715,441 | 2/1998 | Atkinson et al. | 707/1 |
| 5,794,030 | 8/1998 | Morsi et al. | 707/103 |
| 5,835,909 | 11/1998 | Alter | 707/101 |

OTHER PUBLICATIONS

David Beech, Brom Mahbod, *Generalized Version Control in an Object–Oriented Database,* 1988, pp. 14–22.

Simon Gibbs, Dennis Tsichritzis, Eduardo Casais, Oscar Nierstrasz, Xavier Pintado, *Class Management for Software Communities, Communications of the ACM,* vol. 33, No. 9, Sep. 1990, pp. 91–103.

G.T. Nguyen, D. Rieu, *Schema Evolution in Object–Oriented Database Systems, Data & Knowledge Engineering,* 4 (1989), pp. 43–67.

Barbara Staudt Lerner, A. Nico Habermann, *Beyong Schema Evolution to Database Reorganization,* Oopsla Ecoop '90 Proceedings, Conference on Object–Oriented Programming: Systems, Languages, and Applications, European Conference on Object–Oriented Programming, Sigplan Notices, vol. 25, No. 10, Oct. 1990, pp. 67–76.

D. Jason Penney, Jacob Stein, *Class Modification inthe GemStone Object–Oriented DBMS,* Oopsla '87 Proceedings, Oct. 4–8, 1987, pp. 111–117.

Lichao Tan, Takuya Katayama, *Meta Operations for Type Management in Object–Oriented Databases—A Lazy Mechanism for Schema Evolution, Deductive and Object–Oriented Databases,* 1990, pp. 241–258.

Stanley B. Zdonik, *Object–Oriented Type Evolution, Advances in Database Programming Languages,* pp. 277–288.

John F. Roddick, *Schema Evolution in Database Systems—An Annotated Bibliography, Sigmod Record,* vol. 21, No. 4, Dec. 1992, pp. 35–39.

Andrea J. Skarra, Stanley B. Zdonik, *The Management of Chaning Types in an Object–Oriented Database,* Ooplsla '86 Proceedings, Sep. 1986, pp. 483–495.

METHOD AND APPARATUS FOR PROVIDING SCHEMA EVOLUTION WITHOUT RECOMPILATION

ATTRIBUTE OF THE INVENTION

The present invention relates to migrating data between different versions of the same data structures, and more specifically, to a method and apparatus for migrating data to the format expected by an application without recompiling the application.

BACKGROUND OF THE INVENTION

Most software packages are almost constantly evolving. During the evolution of a software package, the software is revised to add new features and to increase the efficiency of old features. Often, a revision to a software package will involve a revision to the data types that are manipulated by the software package. As a software package evolves, numerous versions may be created for the same data type. For example, a first version of a software package may be designed to operate on data that is formatted according to a first version of a data type, while a second version of the same software package is designed to operate on data that is formatted according to a second version of the data type.

All of the versions of a particular data type are referred to as a "schema". A particular version of a data type is referred to as a "schema version". The process of moving from one version of a schema to another version of the schema is referred to as schema evolution. The format of a data type may be modified in a variety of ways during the schema evolution process. For example, new attributes may be added to a data type, existing attributes may be removed from a data type, and the type of data contained in particular attributes may be changed. The structure (e.g. the set of attributes and type of attributes) of a schema version is referred to as the "format" of the schema version.

Computer applications store the data they create according to certain formats, and expect the data that they access to be presented to them according to those same formats. The data formats that a computer application expects to encounter is typically determined by the versions of the schemas used at the time that the computer application is compiled. Thus, if a computer application that operates on a data type, type1, is compiled based on version 5 of type1, the computer application will expect the data it accesses to be presented according to the format of version 5 of type1.

Data created by a software package designed for an earlier schema version must be accessible to software packages designed to operate on later versions of the schema. In addition, data created by a software package designed for a newer schema version must be accessible to software packages designed to operate on earlier versions of the schema. Consequently, two problem situations may arise: (1) an application expects an older version than the version stored on disk, and (2) an application expects a newer version than the version stored on disk.

One approach to solve the problem of making the old data available to new versions of software is to perform a batch conversion on the data using a format conversion tool. During the batch conversion process, the format conversion tool reads data that is stored according to the format of the old schema version (the "old format") and stores the data according to the format of the new schema version (the "new format").

However, the batch conversion approach is not suitable for certain computing environments. For example, depending on the amount of data to be converted, the conversion process may make the data unavailable for a long period of time. Therefore, in computing environments where data must constantly be available, the batch conversion approach will not work.

In addition, batch conversion only exacerbates the problem associated with using applications that expect older versions of data. Once a batch conversion process is completed, all of the data will be stored according to the revised formats. As a result, versions of the software that use the older versions of the data types can no longer be used. To continue to use such software, the software must be recompiled based on the new versions of the data types. Thus, the batch conversion approach is not suitable for environments where some users may continue to access the data with software that expects the data to be presented according to old formats.

Schema evolution addresses both of the problem situations described above. One approach to supporting schema evolution is to maintain type definition information that specifies the latest format of all data types and to require all software to always use the latest format. During the schema conversion process, the type definition information is updated to reflect the formats of the new versions of the schemas. According to this approach, all software that will access the data must be designed to inspect the type definition information before accessing the data in order to know how to access the data. To avoid conflicts, the type definition information for any given schema cannot be modified while any process is currently accessing data associated with the given schema. Conversely, all processes will be blocked from accessing data associated with a particular schema while any data associated with the schema is being converted to a new format.

Based on the foregoing, it is clearly desirable to provide a method and apparatus for allowing schema evolution to occur without making the underlying data inaccessible during a conversion period. It is further desirable to provide a method and apparatus that allows software to access data even when the format of the data is based on a different schema version than the schema version supported and expected by the software.

SUMMARY OF THE INVENTION

A method and apparatus that allow schema evolution to occur without requiring applications that expect older schemas to be recompiled is provided. Data required by an application may be currently stored on any type of storage device, including dynamic or static memory devices. According to one aspect of the invention, each application that requests data is supplied the data in the format that the application expects. To supply the data in the expected format, mechanisms are provided for determining the format expected by the application and the format in which the data is currently stored. A mechanism is also provided for converting the data from the stored format to the expected format when the two formats do not match.

According to another aspect of the invention, a mechanism is provided for tracking the evolution of data types. A schema record is constructed for each new version of each data type. The new schema record is associated with the existing schema record for the previous version of the data type. Each schema record includes format data that describes all of the properties of the particular version of the data type for which the schema record was created, including all of the attributes of any embedded objects. When a new version of a given data type is created, new versions of all data types that embed the given data type are also created. When a new version of a data type does not include all of the attributes of the previous version, then a combined version of the data type is created that includes all of the attributes of both the new version and the previous version.

According to another aspect of the invention, the expected and stored formats of data are determined by first determining the schema version expected by an application and the schema version in which the data is stored. The expected version is determined by inspecting a type version table that is created by the application upon initialization. The type version table of an application is a table that stores all types used by the application and identifies the versions expected by the application for each of the types. The stored version is determined by inspecting stored version information stored with the data. Once the expected and stored versions are identified, the expected and stored formats may be determined by reading the format data stored in the schema records that correspond to the expected and stored versions.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Techniques for managing schema evolution are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1A:
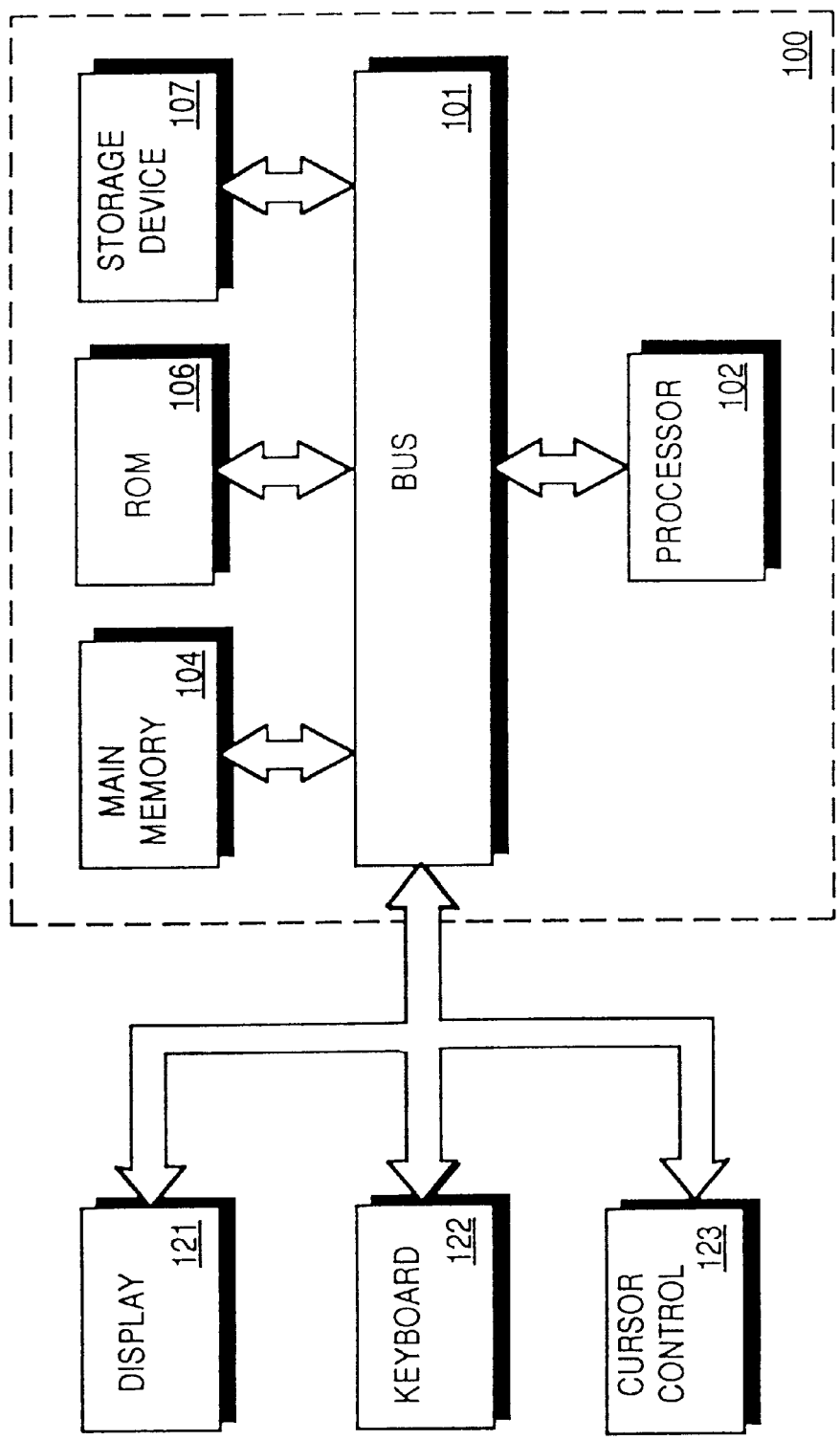
FIG. 1a is a block diagram of a system that may be used to implement the present invention.

Referring to FIG. 1a, the computer system upon which the preferred embodiment of the present invention can be implemented is shown as 100. Computer system 100 comprises a bus or other communication means 101 for communicating information, and a processing means 102 coupled with bus 101 for processing information. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 122 wherein all interface is provided via the stylus as a writing instrument (like a pen) and the written text is interpreted using optical character recognition (OCR) techniques.

The present invention is related to the use of computer system 100 to manage schema evolution. According to one embodiment, schema management operations are performed by computer system 100 in response to processor 102 executing sequences of instructions contained in memory 104. In alternative embodiments, hard-wired circuitry may be used in place of or in combination with software instructions to implement the present invention. Thus, the present invention is not limited to any specific combination of hardware circuitry and software.

Functional Overview

To support schema evolution without requiring applications to be recompiled, the present invention provides mechanisms for (1) determining the schema versions expected by computer programs, (2) determining the schemas versions in which data is stored, (3) determining the formats associated with the various schema versions, and (4) converting data associated with a schema from the format associated with one schema version to the format associated with another schema version.

Figure 1B:
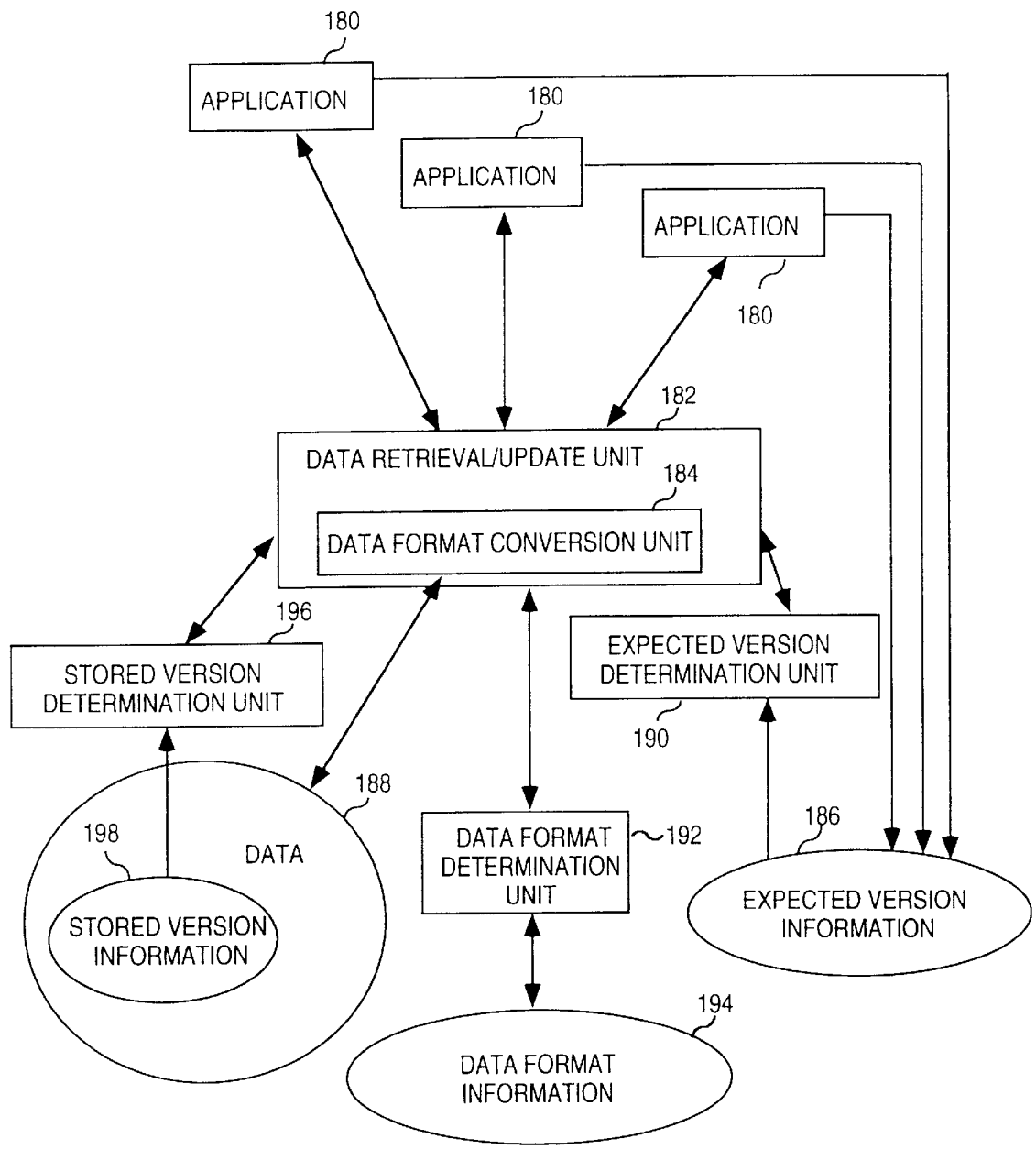
FIG. 1b is a block diagram illustrating a system for performing schema evolution according to an embodiment of the invention.

FIG. 1b is a functional block diagram that illustrates a system that supports schema evolution according to an embodiment of the invention. Referring to FIG. 1b, the system includes a data retrieval/update unit 182, an expected version determination unit 190, a stored version determination unit 196 and a data format determination unit 192.

Numerous applications 180 may access, update, and store data 188 through the data retrieval/update unit 182. The data retrieval/update unit 182 contains a data format conversion unit 184 for converting requested data from one format to another when the format expected by the requesting application (the "target format") does not match the format in which the data is actually stored (the "stored format").

To perform the appropriate data format conversions, the data format conversion unit 184 must know the structure of the stored format and the structure of the target format. To determine the structure of the target format, the schema version expected by the requesting application (the "expected version") must first be determined. To determine the structure of the stored format, the schema version that was used to store the data (the "stored version") must first be determined.

According to one embodiment, the expected version of requested data is determined by the expected version determination unit 190 based on expected version information 186. The stored version of requested data is determined by the stored version determination unit 196 based on stored version information 198 stored with the data 188. The data format determination unit 192 determines the formats associated with the stored and expected schema versions based on data format information 194 maintained by the data format determination unit 192. The operation of each of these functional units shall be described in greater detail below.

Determining the Schema Version Expected by an Application

As mentioned previously, the format in which an application expects data to be presented is typically determined at the time the various components of the application are compiled. An application can be constructed from many libraries, each of which may be compiled at different times based on different versions of data types. A version conflict may arise when two components of the same application expect different versions of the same data type.

According to one embodiment of the invention, version conflicts are detected by requiring each application to register the versions of the data types (the "types") used by its libraries when the application is initialized. Specifically, the initialization routine in the application calls registration routines in the libraries used by the application. The registration routine of each library registers the specific data types used by the library, and specifies the versions of each of the data types used. If two libraries in the same application attempt to register different versions of the same data type, then the execution of the application is halted. Otherwise, the application execution proceeds.

Figure 2:
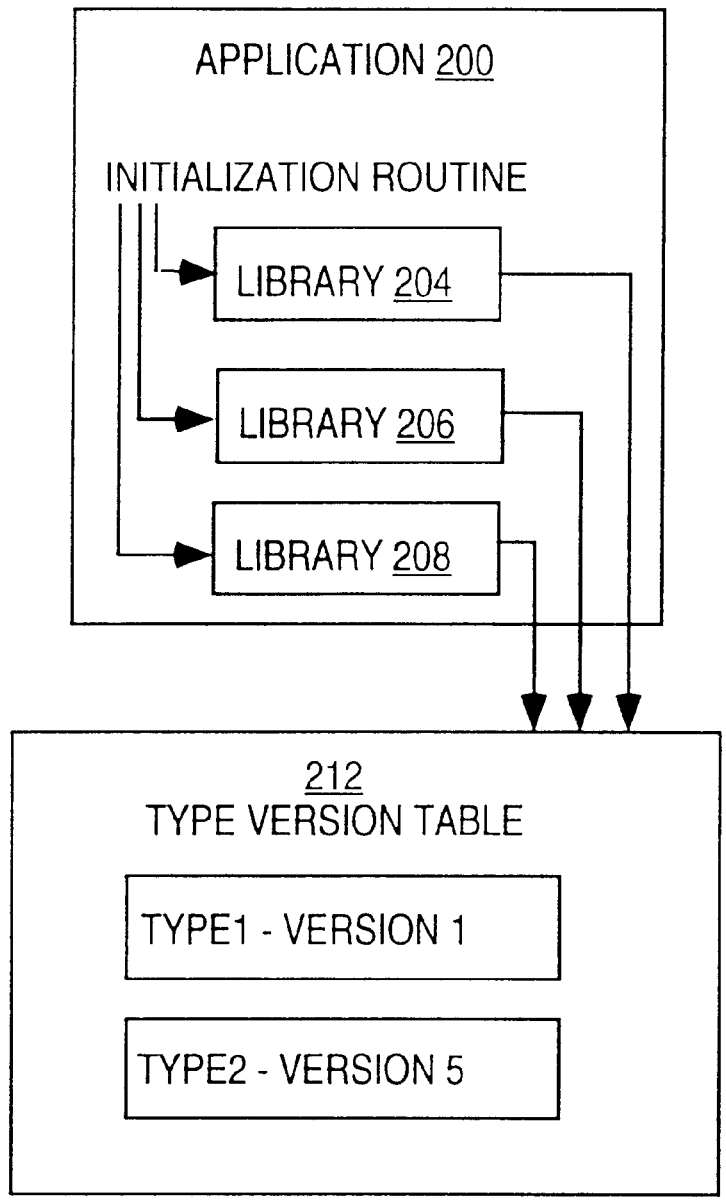
FIG. 2 is a block diagram illustrating a type version table created according to an embodiment of the invention.

FIG. 2 illustrates a system in which an application 200 has performed the type registration process using a type version table 212 according to an embodiment of the invention. Application 200 includes components from three libraries 204, 206 and 208. When application 200 is initialized, the initialization routine of application 200 creates type version table 212. Application 200 calls registration routines in each of the libraries 204, 206 and 208 to cause routines within the libraries to register the data types used by the libraries.

Each registration routine registers the versions of types used by the library to which the registration routine belongs by placing an entry for each type in the type version table 212. Each entry in the type version table 212 indicates a data type and a version of the data type. In the illustrated example, the registration routines of application 200 have inserted entries for version 1 of type1 and version 5 of type2.

When inserting an entry for a data type into the type version table 212, each registration routine checks the type version table 212 to determine if the type version table 212 already contains an entry for the data type. If an entry for the data type already exists, then the application 200 determines whether the version to be registered matches the version that is already registered. No new entry is added if the versions match, since the new entry would simply duplicate the existing entry. If the versions do not match, then a type conflict exists and execution of the application is halted.

For example, assume that the illustrated type version table 212 reflects the registrations made by library 204 and 206, but that library 208 has not yet registered its data types. Assume also that library 208 uses version 2 of type1. When library 208 attempts to register version 2 of type1, type version table 212 is searched for an entry corresponding to type1. When the entry for type1 is found, the version indicated in the entry (version 1) is compared to the version to be registered (version 2). Upon detecting that the versions do not match, execution of application 200 is halted.

According to one embodiment of the present invention, the type version tables that are constructed during program initialization to detect version conflicts within an application are used by expected version determination unit 190 to determine the schemas used by applications. Thus, type version table 212 constitutes the expected version information 186 used by expected version determination unit 190 to determine the expected version when application 200 accesses data 188.

For example, when application 200 attempts to access data stored according to a type1 data type, expected version determination unit 190 inspects the type version table 212 associated with application 200 to determine that application 200 expects version 1 of type1. Expected version determination unit 190 indicates to data retrieval/update unit 182 that application 200 expects version 1 of type 1.

Determining the Schema Version Associated With Stored Data

When a set of data is stored according to the format associated with a particular data type, the data is referred to as an "instance" of the data type. According to one embodiment of the invention, stored version information 198 is stored along with each instance to indicate the data type and schema version associated with the stored instance.

The stored version information 198 stored with the instance of a data type includes a type identifier of the data type and a version identifier. In object oriented systems, a unique object identifier is also typically stored with the instance of an object. When the data retrieval/update unit 182 reads data in response to a request from an application, the stored version determination unit 196 reads the stored version information 198 stored with the data and sends a message to data retrieval/update unit 182 that identifies the schema version associated with the stored data.

Tracking Schema Version Evolution

The present invention includes a mechanism for tracking the formats associated with schema versions, and for providing the appropriate format information to the data format conversion unit 184. According to one embodiment of the invention, the data format information 194 includes all of the information for converting data between schema versions. Specifically, data format information 194 includes a schema version record for each version of each data type used to store data 188. For example, if data 188 includes an instance that was stored according to the format of a "type1" data type, then data format information 194 would include format information for all versions of the type1 data type.

The schema version record for a particular schema version includes format data that describes all of the properties of the schema version, including the attributes in the schema version and the type of data that is stored in each of the attributes. When a new version of a data type is created, a new schema version record is added to the data format information 194. The new schema version record includes format data that describes all of the attributes of the new version of the data type. The new schema version record is then associated with the existing schema version records that correspond to other versions of the same data type.

Figure 3A:
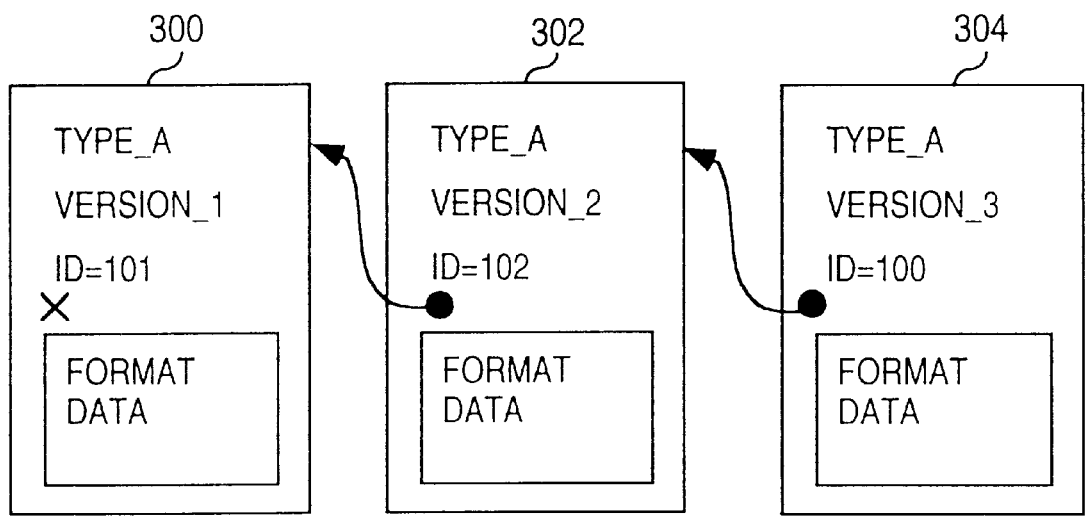
FIG. 3a is a block diagram illustrating schema records for a particular data type according to an embodiment of the invention.

According to one embodiment, each schema version record includes a pointer that indicates the location of a previous schema version record for the same data type. For example, FIG. 3a illustrates schema version records 300, 302 and 304 for the data type "TYPE_A". The schema version record 304 for version 3 of TYPE_A includes a pointer to the location of the schema version record 302 for version 2 of TYPE_A. Likewise, the schema version record 302 for version 2 of TYPE_A includes a pointer to the location of the schema version record 300 for version 1 of TYPE_A. The pointer in the schema version record 300 for version 1 of TYPE_A is set to NULL, indicating that there is no previous version of TYPE_A.

Figure 3B:
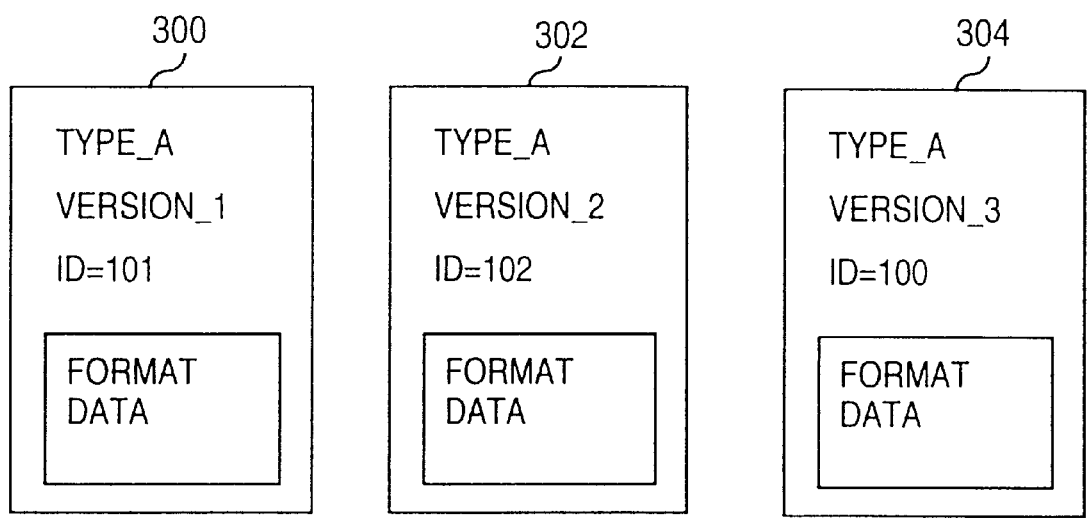
FIG. 3b is a block diagram illustrating schema records for a particular data type according to another embodiment of the invention.

FIG. 3b illustrates an alternate embodiment, where a schema version table 316 is used to store the type and version number for all versions of a type. In the illustrated example, schema version table 316 includes three entries 318, 320 and 322 for data type TYPE_A. Entry 318 indicates that the type ID for VERSION_1 of TYPE_A is 101. Entry 320 indicates that the type ID for VERSION_2 of TYPE_A is 102. Entry 322 indicates that the type ID for VERSION_3 of TYPE_A is 100. The type ID value in entries 318, 320 and 322 may be used as indexes to locate the schema version records 300, 302 and 304 associated with the various versions of TYPE_A.

Embedded Types

Data types may have attributes that are themselves data types. For example, data types named "CAR1" and "TRAIN1" may have an attribute that is itself a data type named "ENGINE1". The data format information of an object that includes an embedded object includes information that describes the data type of the embedded object. For example, assume that ENGINE1 has the attributes "Type-"and "Size". The data format information of CAR1 and TRAIN 1 would therefore include the attribute ENGINE1, which in turn stores the attributes Type and Size.

Because the structure of embedded objects is included in the objects in which they are embedded, new versions of all object types in which a given object type is embedded must be created when a new version of the given object type is created. For example, if an attribute "Weight" is added to the ENGINE data type to create a new version of ENGINE ("ENGINE2"), then new versions of the CAR and TRAIN data types (which include the ENGINE data type) will have to be created. The new CAR and TRAIN data types ("CAR2" and "TRAIN2") will have an ENGINE2 attribute that contains the Weight attribute.

Tracking Attribute Changes Between Versions

As a data type evolves from one version to the next, attributes may be added, deleted, or changed. To accurately convert data between versions of a data type, a mechanism must be provided to indicate the correlation between a particular attribute and any corresponding attribute that appears in other versions of the same data type.

According to one embodiment of the invention, the correlation between attributes of different versions is tracked by assigning each attribute a unique attribute identifier. When a new version of the data type is created, newly added attributes are assigned new attribute identifiers. However, existing attributes that have simply been modified in the new version of the data type maintain their attribute identifiers. For example, assume that the attributes "Type" and "Size" of the data type ENGINE1 have attribute identifiers 100 and 102, respectively. Assume also that in version 2 of the ENGINE data type the name of the "Type" attribute is changed to "Model", and a new attribute "Weight" is added. The new attribute "Weight" will be assigned a new unique attribute identifier. The Size attribute, which remains unchanged, will continue to have the attribute identifier 102. Because the "Model" attribute is a modification of the "Type" attribute, the "Model" attribute will have the same attribute identifier (i.e. 100) as the "Type" attribute.

To prevent erroneous data conversions during the data migration process, attribute identifiers are never reused. For example, if the "Model" attribute of ENGINE2 is deleted in version 3 of ENGINE, the attribute identifier 100 will not be reused for any other attribute.

Type Identifiers

The schema version information stored with each instance includes a type identifier that uniquely identifies the data type that corresponds to the instance, and a version identifier that indicates which version of the data type corresponds to the instance. Each schema version record also includes a type identifier and a version identifier. In the preferred embodiment, the schema version record associated with the most recent version of a data type is always assigned the type identifier of the data type.

Therefore, when a new version of a data type is created, the schema version record associated with the new version of the data type is assigned the type identifier of the data type. However, the schema version record associated with the previous version of the data type will have been assigned the same type identifier when it was created. Rather than allow two schema version records to have the same type identifier, the type identifier of the previous schema version record is updated to a new value.

Figure 4A:
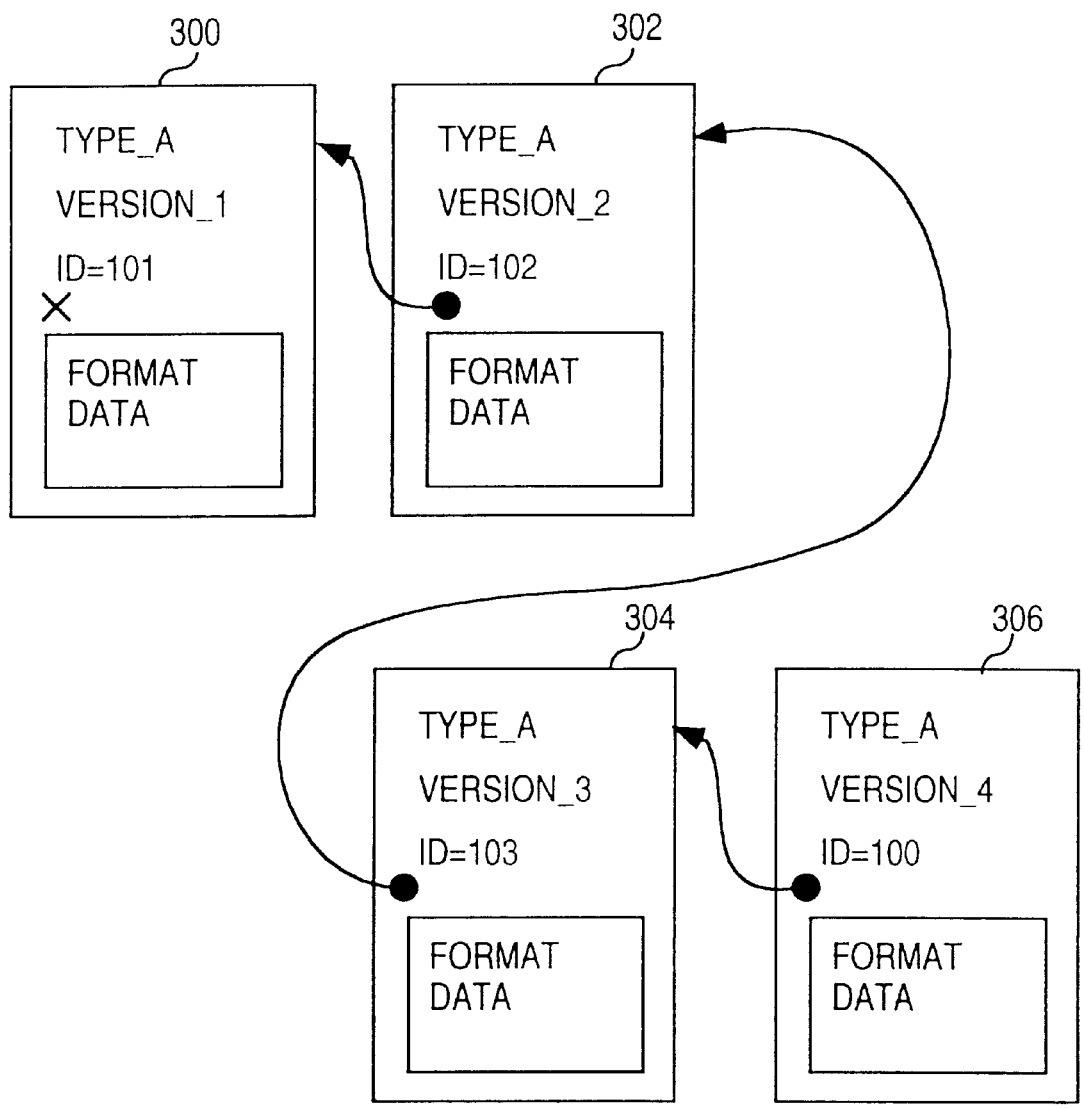
FIG. 4a is a block diagram illustrating the schema record of FIG. 3a after a new version of the data type has been created.

For example, assume that three versions of data type TYPE_A have been created as shown in FIG. 3a. The type identifier of the most recent version of TYPE_A is 100, indicating that the type identifier of TYPE_A is 100. If a version 4 of data type TYPE_A is created, then the schema version record 306 (FIG. 4a) associated with version 4 is assigned the type identifier 100. The type identifier in the schema version record 304 associated with version 3 of TYPE_A is updated to a new value. FIG. 4a illustrates the records for TYPE_A after a version 4 of TYPE_A has been created in an embodiment in which the schema version records of a data type are linked.

Figure 4B:
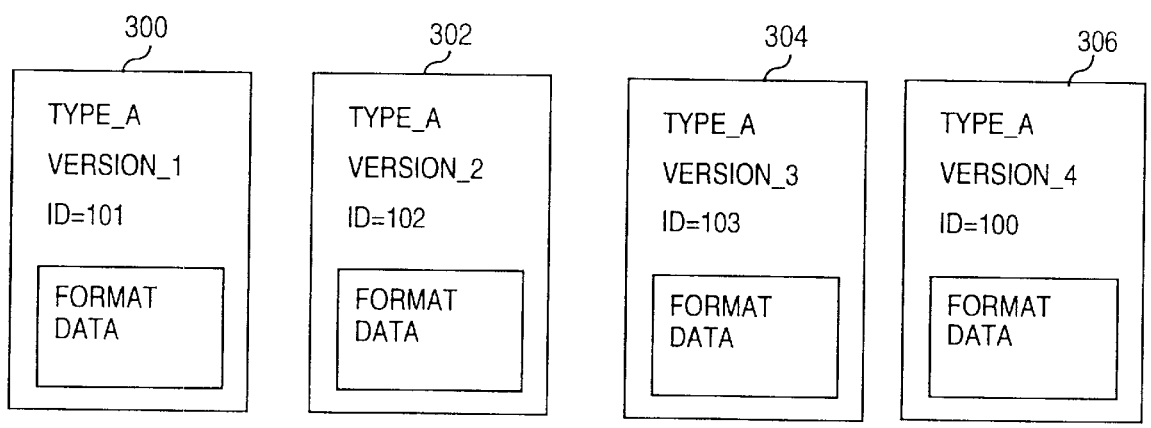
FIG. 4b is a block diagram illustrating the schema record of FIG. 3b after a new version of the data type has been created.

FIG. 4b illustrates the records for TYPE_A after a version 4 of TYPE_A has been created in an embodiment that uses a schema version table. Referring to FIG. 4b, entry 322 and schema version record 304 have been updated to indicate that the type identifier for VERSION_3 of TYPE_A is 103. A new entry 324 is added to schema version table 316 for VERSION_4 of TYPE_A. The new entry indicates that the type identifier for VERSION_4 of TYPE_A is 100, as also indicated by the new schema version record 306 for VERSION_4 of TYPE_A.

Determining the Current and Target Formats

As mentioned above, the expected version determination unit 190 is configured to determine the schema version that an application expects based on the type version tables constructed during the type registration process. The stored version determination unit 196 determines the schema version in which an instance was stored based on stored version information 198 that is stored with the data. However, the mere identities of the expected version and the stored version do not provide enough information for data format conversion unit 184 to convert data between formats.

When the stored version for an instance has been determined, the data format determination unit 192 is able to determine the stored format of the instance based on the type identifier and version identifier stored with the data. According to one embodiment of the invention, the schema version record for most recent version of an instance is found based on the type identifier that is stored with the data. The type identifier in the schema version record for the most recent version of the data type will match the type identifier stored with all instances of the data type, regardless of the versions of the data type used to store those instances.

In a system that includes TYPE_A as illustrated in FIG. 4a, all instances of TYPE_A will be stored with the type identifier 100. This is true regardless of whether the actual format of the instance corresponds to version 1, 2, 3 or 4 of the TYPE_A data type. Data format determination unit 192 uses the type identifier 100 to find schema version record 306, which is schema version record for the most recent version of the TYPE_A data type.

When the schema version record for the most recent version of the data type is found, the version identifier in the schema version record is compared to the version identifier stored with the instance. If the version identifiers match, then the data format determination unit 192 knows that the format data stored in the schema version record associated with the most recent version defines the format in which the instance is stored (the stored format).

If the version identifier in the schema version record does not match the version identifier stored with the data, then the data format determination unit 192 must find the schema version record for the version indicated by the version identifier stored with the instance. In the embodiment illustrated in FIG. 3a, the data format determination unit 192 finds the appropriate schema version record by traversing the links contained in the schema version records. For example, if the version associated with the most recent schema version record and the version that corresponds to the data are two versions apart, then the data format determination unit 192 must traverse two links to reach the schema version record that indicates the stored format. In the embodiment illustrated in FIG. 3b, data format determination unit 192 finds the appropriate schema version record by performing a lookup in the schema version table 316.

The same process that data format determination unit 192 uses to determine the stored format of an instance is used to determine the target format for a conversion operation. Specifically, in the embodiment illustrated in FIG. 3a, the data format determination unit 192 compares the version identifier for the data type of the requested data (as indicated in the type version table of the application requesting the data) to the version identifier located in the schema version record for the most recent version of the data type. If the version identifiers match, then the data format determination unit 192 knows that the format data stored in the schema version record associated with the most recent version defines the target format. If the version identifier in the schema version record does not match the version identifier, then the data format determination unit 192 must traverse the links contained in the schema version records to find the schema version record for the expected version.

In the embodiment illustrated in FIG. 3b, the data format determination unit 192 simply performs a table lookup based on the version identifier for the data type of the requested data. The appropriate entry of the schema version table 316 will indicate the type identifier that may be used to locate the schema version record that specifies the target format.

While the embodiments described above use linked schema version records or a schema version table to the track format changes that occur between the various versions of each data type, other embodiments may employ other format tracking mechanisms. The present invention is not limited to any particular mechanism for tracking format changes.

Converting Data Between Schema Versions

When the expected format and the stored format do not match, then the data contained in an instance must be converted from the stored format to the target format before the data is supplied to the requesting application. According to one embodiment of the invention, data format conversion unit 184 performs the conversion process by creating a target instance that corresponds to the stored instance, but in which the data is stored in the target format.

To create the target instance of a requested instance, the data format conversion unit 184 compares attributes in stored format to attributes in target format. For attributes that are identical in both the current and target formats, the data format conversion unit 184 copies the data into the target instance. For attributes that are present in the stored format that do not exist in the target format, no data is placed in the target instance. For attributes that are not present in the stored format but are present in the target format, user-defined default values or NULL values are stored in the target instance of the object. For example, a NULL string may be placed in the target instance for a string attribute that exists in the target format but not in the stored format.

For attributes that are present in both the target and stored formats, but that have been changed, conversion operations are performed to convert the data from the stored format to the target format. For example, if the target format specifies that an attribute holds a fixed point decimal value and the stored format specifies that the same attribute holds an integer, then the integer that is stored in the attribute in the stored format is converted to a fixed point decimal value and stored in the target instance of the object.

Once the target instance has been created according to the conversion rules described above, the target instance is passed to the application that requested access to the instance. Because the target instance reflects the data format expected by the requesting application, the requesting application is able to accurately read and write data to the target instance.

"Complete" Schema Versions

Data can be lost during the migration process if later versions of a data type do not include all of the attributes of earlier data types. For example, if version 2 of a data type has an attribute "Name", applications that use version 2 of the data type will typically store data in the "Name" attribute in every object instance they create or update. If version 3 of the data type does not include a "Name" attribute, then the data that has been stored in the "Name" attribute of such instances will be lost when the instances are migrated to the format associated with version 3 of the data type.

To prevent such data loss, a "complete version" of a data type may be created when a new version of a data type drops information from a previous version. For example, if version 1 of a data type included attributes A and B, and version 2 of the same data type included attributes A and C, then upon the creation of the schema version record for version 2 of the data type, the data format determination unit 192 would also create a version 3 of the data type that includes attributes A, B and C. When an instance stored according to version 1 of the data type is updated by an application that uses version 2 of the data type, or an instance stored according to version 2 is updated by an application that uses version 1 of the data type, the updated data is stored according to version 3 of the data type.

According to one embodiment, a user that is creating a new version of a data type that does not have all of the attributes of the previous version may indicate if the deleted attributes should still be stored with the new type version. If the user decides that the deleted attributes should not be stored with the new type version, then no "complete" schema version is created. Under these conditions, the user may specify a function that may be used to compute the deleted attribute value when an old application uses the previous version. If no function is provided, a defaut value may be used, or the attribute value may simply be set to null. In this embodiment, a complete version of a data type is only created if the user altering the data type indicates that the deleted attribute should be stored with the new type version.

Data Migration Strategies

According to one embodiment, the data 188 is gradually migrated to the formats associated with newer schema versions. Specifically, the stored format of an instance is only changed if the instance has been updated by an application that uses a format that is newer than the stored format. The flow chart illustrated in FIG. 5 illustrates this migration strategy.

Figure 5:
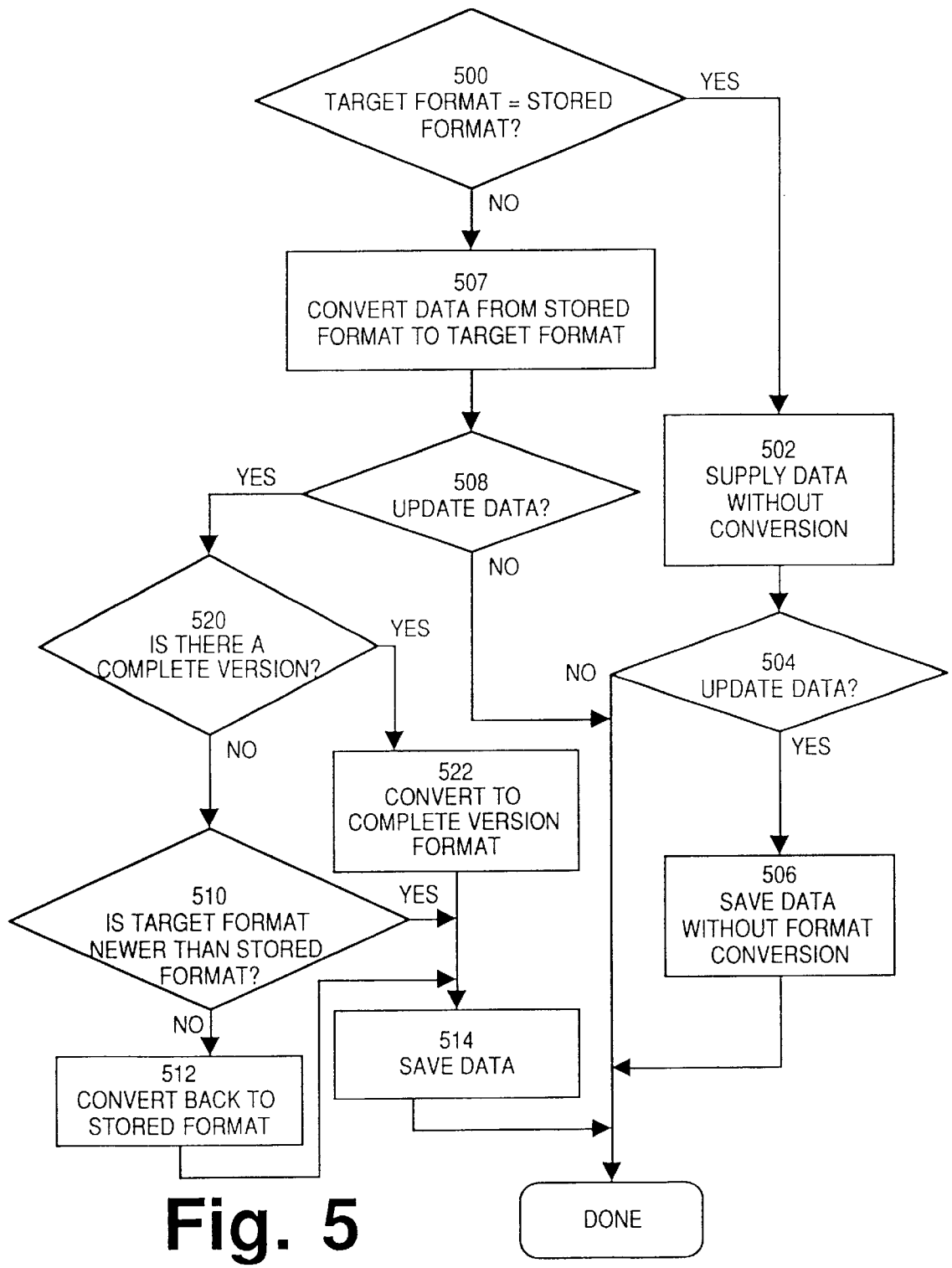
FIG. 5 is a flow chart illustrating the steps performed when an application accesses data according to an embodiment of the invention.

Referring to FIG. 5, when an application requests access to an instance, the target format is compared with the stored format at step 500. If the target format matches the stored format, control passes to step 502. At step 502, a copy of the stored instance is passed to the requesting application without any format conversion. If the application merely reads the data, then no further operations are performed. If the application updates the data, then control passes from step 504 to step 506 where the updated instance is saved without any format conversion. Thus, if a requested instance that is stored according to version 1 of type 1 is updated by a program that expects version 1 of type 1, the updated instance will be stored according to version 1 of type1. This is true even if version 1 of type 1 is not the most recent version of type1.

If the target format does not match the expected format, then control passes to step 507. At step 507, the data is converted from the stored format to the target format. If the requesting application does not update the data, then the stored instance is not changed. Otherwise, control passes from step 508 to step 520.

At step 520, it is determined whether a "complete version" of the data type has been created. As explained above, a complete version may have been created if a newer version of the data type does not include all of the attributes of an older version of the data type. If a complete version of a data type has been created, then control passes to step 522 where the data is converted to the format of the complete version. Otherwise, control passes to step 510.

At step 510, it is determined whether the target format is newer than the stored format. If the target format is newer than the stored format, then the data is saved in the target format at step 514. If the target format is older than the stored format, then the data is converted back to the stored format at step 512 before the data is saved at step 514.

Using this migration strategy, the database does not become unavailable as it does with batch conversion operations. In addition, data that is only updated by applications that use older data formats remain stored in the older data formats, thereby reducing the number of format conversions that must be performed. However, the migration strategy gives preference to newer data formats by migrating data to the newer formats when updated by an application that uses the newer formats. In addition, once stored data has been stored according to a newer format, the stored data is never migrated back to the older format.

It should be noted that the present invention may be used with migration strategies other than the strategy described above. For example, the data format conversion unit 184 may be configured to store all newly created data and all updated data in format of the latest schema version, regardless of the schema version used by the application that created or modified the data.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for supplying data to an application, the method comprising the computer-implemented steps of:

receiving a request initiated by the application for stored data to be supplied to the application;

in response to the request to supply the stored data to the application, performing the steps of determining a first format, said first format being the format in which said stored data is stored, and determining a second format, said second format being the format in which said application expects to receive said stored data;

creating a target instance of said stored data by converting said stored data from said first format to said second format without said application that requested the stored data or users of the application that requested the stored data knowing the format in which the stored data is stored; and supplying said target instance to the application that requested the stored data.

2. The method of claim 1 wherein the step of determining the second format comprises the steps of:

determining a data type that corresponds to said stored data;

determining a first version identifier that identifies a version of said data type that said application uses;

searching for a first schema version record that corresponds to said data type;

comparing a second version identifier in said first schema version record with said first version identifier;

if said second version identifier matches said first version identifier, then reading data that describes said second format from format data contained in said first schema version record;

if said second version identifier does not match said first version identifier, then finding a second schema version record that is associated with said data type and which contains said first version identifier; and reading data that describes said second format from format data contained in said second schema version record.

3. The method of claim 2 wherein the step of searching for a first schema version record comprises the steps of:

determining a type identifier that uniquely identifies said data type; and performing a search on a plurality of schema version records based on said type identifier.

4. The method of claim 1 wherein the step of determining the second format comprises the steps of:

determining a data type that corresponds to said stored data;

determining a first version identifier that identifies a version of said data type that said application uses;

using said data type and first version identifier to locate an entry in a table; and using information in said entry to locate a schema version record that specifies said second format.

5. The method of claim 2 where in the step of determining the first version identifier includes the steps of:

inspecting an entry associated with said data type in a type version table associated with said application; and reading said first version identifier from said entry.

6. The method of claim 5 further comprising the step of causing said application to build said type version table upon initialization by:

causing an initialization routine with in the application to call registration routines for a plurality of libraries used by said application; and causing said registration routines to add entries to said type version table to indicate which versions of data types are used by said plurality of libraries.

7. The method of claim 1 wherein said step of determining said first format includes the steps of:

determining a data type that corresponds to said stored data;

determining a first version identifier that identifies a version of said data type that was used to store said stored data;

searching for a first schema version record that corresponds to said data type;

comparing a second version identifier in said first schema version record with said first version identifier;

if said second version identifier matches said first version identifier, then reading data that describes said first format from format data contained in said first schema version record;

if said second version identifier does not match said first version identifier, then finding a second schema version record that is associated with said data type and which contains said first version identifier; and reading data that describes said first format from format data contained in said first schema version record.

8. The method of claim 7 wherein said step of determining said first version identifier includes the step of reading schema version information stored with said stored data.

9. The method of claim 1 wherein the step of converting said stored data from said first format to said second format includes the step of:

comparing attributes specified in said first format with attributes specified in said second format;

if an attribute exists in said first format and said second format, then copying data for said attribute from said stored data to said target instance;

if an attribute exists in said second format but not said first format, then storing a default value for said attribute in said target instance;

if an attribute exists in said first format but not in said second format, then not copying data that corresponds to said attribute from said stored data to said target instance.

10. The method of claim 9 wherein the step of copying data for said attribute comprises the steps of:

determining whether said attribute has an identical format in said first format and said second format;

if said attribute has an identical format in said first format and said second format, then copying data for said attribute from said stored data to said target instance without performing any conversion operation; and if said attribute does not have an identical format in said first format and said second format, then reading data for said attribute from said stored data;

performing a conversion operation on said data for said attribute to create reformatted data; and storing said reformatted data for said attribute in said target instance.

11. The method of claim 9 wherein said step of comparing attributes specified in said first format with attributes specified in said second format includes comparing a first set of attribute identifiers that uniquely identify attributes in said first format with a second set of attribute identifiers that uniquely identify attributes in said second format.

12. The method of claim 7 wherein:

the data type includes an embedded data type; and the step of reading data that describes said first format from format data contained in said first schema version record includes reading data that describes a structure of said embedded data type.

13. A computer-readable medium carrying one or more sequences of one or more instructions for supplying data to an application, the one or more sequences of one or more instructions including instructions which, when executed by one or more processors, cause the one or more processors to perform the steps of:

receiving a request initiated by the application for stored data to be supplied to the application;

determining a first format, said first format being the format in which said stored data is stored, and determining a second format, said second format being the format in which said application expects to receive said stored data;

creating a target instance of said stored data by converting said stored data from said first format to said second format without said application that requested the stored data or users of the application that requested the stored data knowing the format in which the stored data is stored; and supplying said target instance to the application that requested the stored data.

14. The computer-readable medium of claim 13, wherein the step of determining the second format comprises the steps of:

determining a data type that corresponds to said stored data;

determining a first version identifier that identifies a version of said data type that said application uses;

searching for a first schema version record that corresponds to said data type;

comparing a second version identifier in said first schema version record with said first version identifier;

if said second version identifier matches said first version identifier, then reading data that describes said second format from format data contained in said first schema version record;

if said second version identifier does not match said first version identifier, then finding a second schema version record that is associated with said data type and which contains said first version identifier; and reading data that describes said second format from format data contained in said second schema version record.

15. The computer-readable medium of claim 14, wherein the step of searching for a first schema version record comprises the steps of:

determining a type identifier that uniquely identifies said data type; and performing a search on a plurality of schema version records based on said type identifier.

16. The computer-readable medium of claim 13, wherein the step of determining the second format comprises the steps of:

determining a data type that corresponds to said stored data;

determining a first version identifier that identifies a version of said data type that said application uses;

using said data type and first version identifier to locate an entry in a table; and using information in said entry to locate a schema version record that specifies said second format.

17. The computer-readable medium of claim 14, wherein the step of determining the first version identifier includes the steps of:

inspecting an entry associated with said data type in a type version table associated with said application; and reading said first version identifier from said entry.

18. The computer-readable medium of claim 17, further comprising the step of causing said application to build said type version table upon initialization by:

causing an initialization routine within the application to call registration routines for a plurality of libraries used by said application; and causing said registration routines to add entries to said type version table to indicate which versions of data types are used by said plurality of libraries.

19. The computer-readable medium of claim 13, wherein said step of determining said first format includes the steps of:

determining a data type that corresponds to said stored data;

determining a first version identifier that identifies a version of said data type that was used to store said stored data;

searching for a first schema version record that corresponds to said data type;

comparing a second version identifier in said first schema version record with said first version identifier;

if said second version identifier matches said first version identifier, then reading data that describes said first format from format data contained in said first schema version record;

if said second version identifier does not match said first version identifier, then finding a second schema version record that is associated with said data type and which contains said first version identifier; and reading data that describes said first format from format data contained in said first schema version record.

20. The computer-readable medium of claim 19, wherein said step of determining said first version identifier includes the step of reading schema version information stored with said stored data.

21. The computer-readable medium of claim 19, wherein the step of converting said stored data from said first format to said second format includes the step of:

comparing attributes specified in said first format with attributes specified in said second format;

if an attribute exists in said first format and said second format, then copying data for said attribute from said stored data to said target instance;

if an attribute exists in said second format but not said first format, then storing a default value for said attribute in said target instance;

if an attribute exists in said first format but not in said second format, then not copying data that corresponds to said attribute from said stored data to said target instance.

22. The computer-readable medium of claim 21, wherein the step of copying data for said attribute comprises the steps of:

determining whether said attribute has an identical format in said first format and said second format;

if said attribute has an identical format in said first format and said second format, then copying data for said attribute from said stored data to said target instance without performing any conversion operation; and if said attribute does not have an identical format in said first format and said second format, then reading data for said attribute from said stored data;

performing a conversion operation on said data for said attribute to create reformatted data; and storing said reformatted data for said attribute in said target instance.

23. The computer-readable medium of claim 21, wherein said step of comparing attributes specified in said first format with attributes specified in said second format includes comparing a first set of attribute identifiers that uniquely identify attributes in said first format with a second set of attribute identifiers that uniquely identify attributes in said second format.

24. The computer-readable medium of claim 22 wherein:

the data type includes an embedded data type; and the step of reading data that describes said first format from format data contained in said first schema version record includes reading data that describes a structure of said embedded data type.

25. A computer system for supplying data to an application, computer system comprising:

one or more processors;

a memory coupled to the one or more processors and containing one or more sequences of one or more instructions which, when executed by the one or more processors, cause the one or more processors to perform the steps of:

receiving a request initiated by the application for stored data to be supplied to the application;

in response to the request to supply the stored data to the application, performing the steps of determining a first format, said first format being the format in which said stored data is stored, and determining a second format, said second format being the format in which said application expects to receive said data;

creating a target instance of said stored data by converting said stored data from said first format to said second format without said application that requested the stored data or users of the application that requested the stored data knowing the format in which the stored data is stored; and supplying said target instance to the application that requested the stored data.

26. The computer system of claim 25, wherein the sequences of instructions for performing the step of determining the second format comprises sequences of instructions for performing the steps of:

determining a data type that corresponds to said stored data;

determining a first version identifier that identifies a version of said data type that said application uses;

searching for a first schema version record that corresponds to said data type;

comparing a second version identifier in said first schema version record with said first version identifier;

if said second version identifier matches said first version identifier, then reading data that describes said second format from format data contained in said first schema version record;

if said second version identifier does not match said first version identifier, then finding a second schema version record that is associated with said data type and which contains said first version identifier; and reading data that describes said second format from format data contained in said second schema version record.

27. The computer system of claim 26, wherein the sequences of instructions for performing the step of searching for a first schema version record comprises sequences of instructions for performing the steps of:

determining a type identifier that uniquely identifies said data type; and performing a search on a plurality of schema version records based on said type identifier.

28. The computer system of claim 25, wherein the sequences of instructions for performing the step of determining the second format comprises sequences of instructions for performing the steps of:

determining a data type that corresponds to said stored data;

determining a first version identifier that identifies a version of said data type that said application uses;

using said data type and first version identifier to locate an entry in a table; and using information in said entry to locate a schema version record that specifies said second format.

29. The computer system of claim 26, wherein the sequences of instructions for performing the step of determining the first version identifier include sequences of instructions for performing the steps of:

inspecting an entry associated with said data type in a type version table associated with said application; and reading said first version identifier from said entry.

30. The computer system of claim 29, wherein the memory further comprises sequences of instructions for causing said application to build said type version table upon initialization by:

causing an initialization routine within the application to call registration routines for a plurality of libraries used by said application; and causing said registration routines to add entries to said type version table to indicate which versions of data types are used by said plurality of libraries.

31. The computer system of claim 25, wherein the sequences of instructions for performing the step of determining said first format include sequences of instructions for performing the steps of:

determining a data type that corresponds to said stored data;

determining a first version identifier that identifies a version of said data type that was used to store said stored data;

searching for a first schema version record that corresponds to said data type;

comparing a second version identifier in said first schema version record with said first version identifier;

if said second version identifier matches said first version identifier, then reading data that describes said first format from format data contained in said first schema version record;

if said second version identifier does not match said first version identifier, then finding a second schema version record that is associated with said data type and which contains said first version identifier; and reading data that describes said first format from format data contained in said first schema version record.

32. The computer system of claim 31, wherein the sequences of instructions for performing the step of determining said first version identifier include sequences of instructions for performing the step of reading schema version information stored with said stored data.

33. The computer system of claim 25, wherein the sequences of instructions for performing the step of converting said stored data from said first format to said second format include sequences of instructions for performing the step of:

comparing attributes specified in said first format with attributes specified in said second format;

if an attribute exists in said first format and said second format, then copying data for said attribute from said stored data to said target instance;

if an attribute exists in said second format but not said first format, then storing a default value for said attribute in said target instance;

if an attribute exists in said first format but not in said second format, then not copying data that corresponds to said attribute from said stored data to said target instance.

34. The computer system of claim 33, wherein the sequences of instructions for performing the step of copying data for said attribute comprise sequences of instructions for performing the steps of:
  determining whether said attribute has an identical format in said first format and said second format;
  if said attribute has an identical format in said first format and said second format, then copying data for said attribute from said stored data to said target instance without performing any conversion operation; and
  if said attribute does not have an identical format in said first format and said second format, then
    reading data for said attribute from said stored data;
    performing a conversion operation on said data for said attribute to create reformatted data; and
    storing said reformatted data for said attribute in said target instance.

35. The computer system of claim 33, wherein the sequences of instructions for performing the step of comparing attributes specified in said first format with attributes specified in said second format include sequences of instructions for comparing a first set of attribute identifiers that uniquely identify attributes in said first format with a second set of attribute identifiers that uniquely identify attributes in said second format.

36. The computer system of claim 31, wherein:
  the data type includes an embedded data type; and
  the sequences of instructions for performing the step of reading data that describes said first format from format data contained in said first schema version record include sequences of instructions for reading data that describes a structure of said embedded data type.

37. A method for supplying data to a client application in a database system, the method comprising the computer-implemented steps of:
  a database server receiving a request initiated by a client application for stored data to be supplied to the client application; and
  in response to the request to supply stored data to the client application, performing the steps of
    determining a first format in which the stored data is stored in the database system;
    determining a second format in which the client application expects to receive the stored data;
    the database server causing a target instance of the stored data to be created by converting the stored data from the first format to the second format without the client application that requested the stored data or users of the client application that requested the stored data knowing the format in which the stored data is stored; and
    the database server causing the target instance to be supplied to the client application that requested the stored data.

38. The method of claim 37, wherein the step of determining a second format in which the client application expects to receive the data comprises the steps of:
  determining a data type that corresponds to the stored data;
  determining a first version identifier that identifies a version of the data type that the client application uses;
  searching for a first schema version record that corresponds to the data type;
  comparing a second version identifier in the first schema version record with the first version identifier;
  if the second version identifier matches the first version identifier, then the reading data that describes the second format from format data contained in the first schema version record;
  if the second version identifier does not match the first version identifier, then
    finding a second schema version record that is associated with the data type and which contains the first version identifier; and
    reading data that describes the second format from format data contained in the second schema version record.

39. The method of claim 38, wherein the step of searching for a first schema version record comprises the steps of:
  determining a type identifier that uniquely identifies the data type; and
  performing a search on a plurality of schema version records based on the type identifier.

40. The method of claim 37, wherein the step of determining the second format comprises the steps of:
  determining a data type that corresponds to the stored data;
  determining a first version identifier that identifies a version of the data type that the application uses;
  using the data type and first version identifier to locate an entry in a table; and
  using information in the entry to locate a schema version record that specifies the second format.

41. The method of claim 38, wherein the step of determining the first version identifier includes the steps of:
  inspecting an entry associated with the data type in a type version table associated with the application; and
  reading the first version identifier from the entry.

42. The method of claim 41, further comprising the step of causing the application to build the type version table upon initialization by:
  causing an initialization routine within the application to call registration routines for a plurality of libraries used by the application; and
  causing the registration routines to add entries to the type version table to indicate which versions of data types are used by the plurality of libraries.

43. The method of claim 37, where in the step of determining the first format includes the steps of:
  determining a data type that corresponds to the stored data;
  determining a first version identifier that identifies a version of the data type that was used to store the stored data;
  searching for a first schema version record that corresponds to the data type;
  comparing a second version identifier in the first schema version record with the first version identifier;
  if the second version identifier matches the first version identifier, then reading data that describes the first format from format data contained in the first schema version record;
  if the second version identifier does not match the first version identifier, then
    finding a second schema version record that is associated with the data type and which contains the first version identifier; and reading data that describes the first format from format data contained in the first schema version record.

44. The method of claim 43, wherein the step of determining the first version identifier includes the step of reading schema version information stored with the stored data.

45. The method of claim 37, wherein the step of converting the stored data from the first format to the second format includes the step of:

comparing attributes specified in the first format with attributes specified in the second format;

if an attribute exists in the first format and the second format, then copying data for the attribute from the stored data to the target instance;

if an attribute exists in the second format but not the first format, then storing a default value for the attribute in the target instance;

if an attribute exists in the first format but not in the second format, then not copying data that corresponds to the attribute from the stored data to the target instance.

46. The method of claim 45, wherein the step of copying data for the attribute comprises the steps of:

determining whether the attribute has an identical format in the first format and the second format;

if the attribute has an identical format in the first format and the second format, then copying data for the attribute from the stored data to the target instance without performing any conversion operation; and if the attribute does not have an identical format in the first format and the second format, then reading data for the attribute from the stored data;

performing a conversion operation on the data for the attribute to create reformatted data; and storing the reformatted data for the attribute in the target instance.

47. The method of claim 45, wherein the step of comparing attributes specified in the first format with attributes specified in the second format includes comparing a first set of attribute identifiers that uniquely identify attributes in the first format with a second set of attribute identifiers that uniquely identify attributes in the second format.

48. The method of claim 43 wherein:

the data type includes an embedded data type; and the step of reading data that describes the first format from format data contained in the first schema version record includes reading data that describes a structure of the embedded data type.

* * * * *

UNITED STATES PATENT AND TRADEMARK OFFICE
CERTIFICATE OF CORRECTION

PATENT NO.     : 6,119,130
DATED          : September 12, 2000
INVENTOR(S)    : Tin Anh Nguyen, et al.

It is certified that error appears in the above-identified patent and that said Letters Patent is hereby corrected as shown below:

Column 16,
Claim 21,
Line 25, replace "claim 19" with -- claim 13 --.

Claim 24,
Line 64, replace "claim 22" with -- claim 19 --.

Signed and Sealed this

Twenty-eighth Day of August, 2001

*Attest:*

*Attesting Officer*

NICHOLAS P. GODICI
*Acting Director of the United States Patent and Trademark Office*